April 21, 1942.   A. O. McCOLLUM   2,280,196
BRAKE
Filed June 17, 1939

INVENTOR.
ANDREW O. McCOLLUM
BY
ATTORNEY.

Patented Apr. 21, 1942

2,280,196

UNITED STATES PATENT OFFICE 2,280,196

BRAKE

Andrew O. McCollum, Detroit, Mich., assignor to Hydraulic Brake Company, Detroit, Mich., a corporation of California Application June 17, 1939, Serial No. 279,750

14 Claims. (Cl. 188—79.5)

This invention relates to brakes, and more particularly to means for automatically adjusting the friction elements of internal expanding brakes.

An object of the invention is to provide fluid pressure actuated means operative to automatically extend the overall length of a friction element.

Another object of the invention is to provide a fluid pressure actuated coupling for a pair of friction elements operative to automatically take up slack between the elements.

Another object of the invention is to provide a brake including a plurality of braking elements having friction linings, means associated with each element for automatically adjusting the elements proportionately to wear of the linings, and a fluid pressure actuated coupling for the elements operative to automatically extend the overall length of the elements.

A further object of the invention is to provide a self-contained fluid pressure coupling.

Yet a further object of the invention is to provide a fluid pressure actuated coupling having few parts of simple structure that may be easily and quickly assembled.

Other objects of the invention will appear from the following description taken in connection with the drawing forming a part of this specification, and in which—

Figure 1:
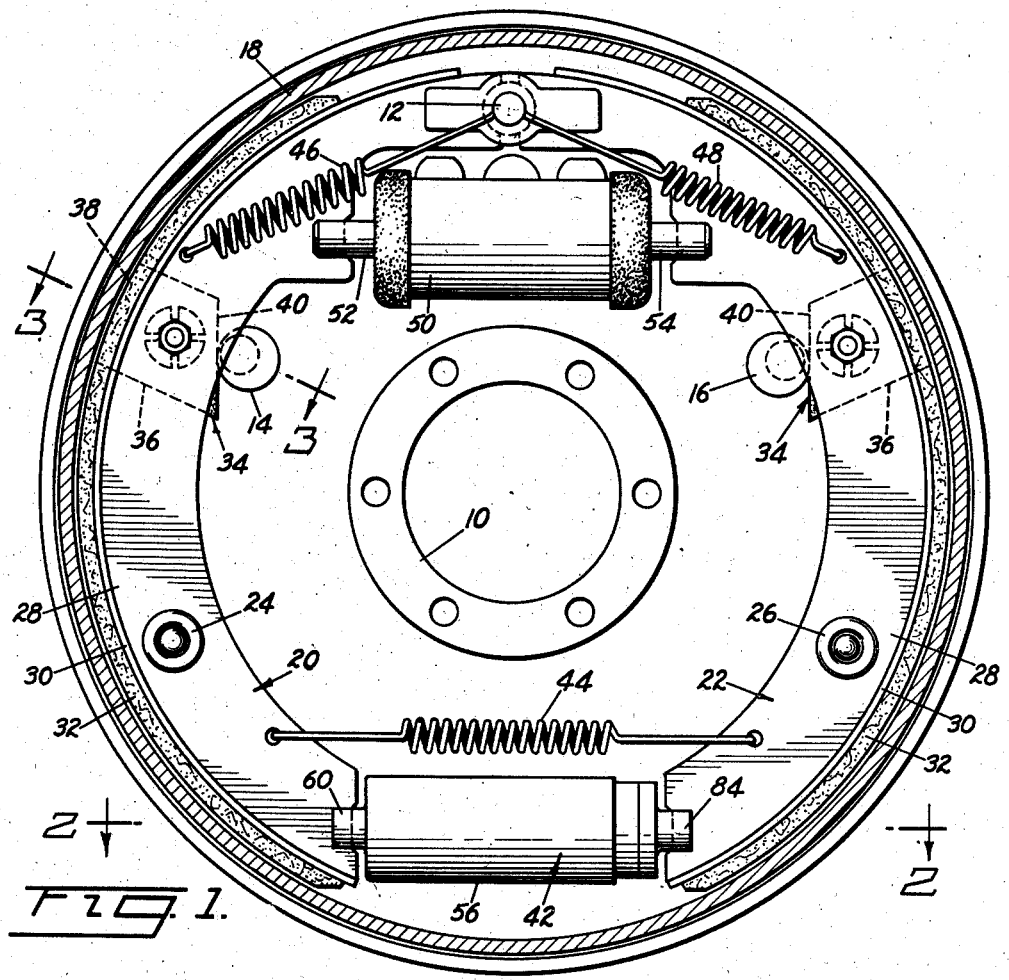
Fig. 1 is a vertical sectional view of a brake embodying the invention.
Figure 2:
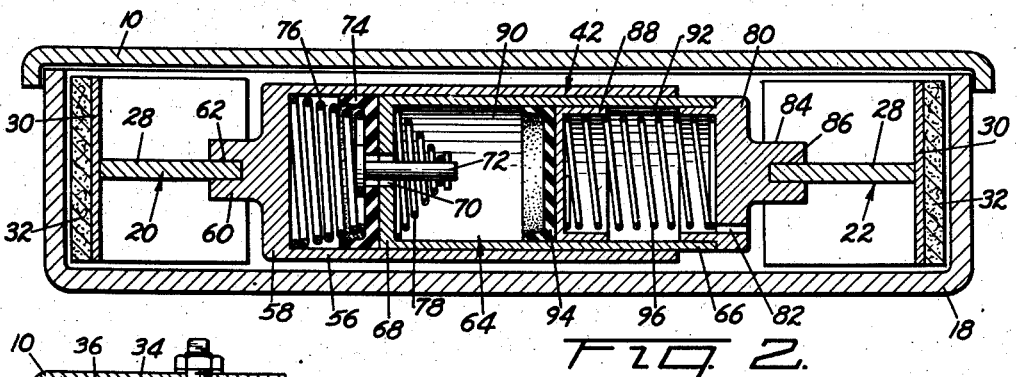
Fig. 2 is a sectional view substantially on line 2—2, Fig. 1.
Figure 3:
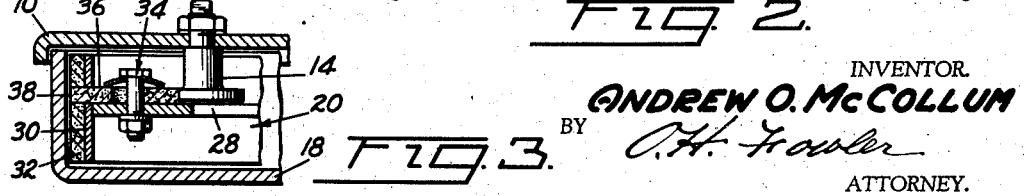
Fig. 3 is a sectional view substantially on line 3—3, Fig. 1.

Referring to the drawing for more specific details of the invention, 10 represents a fixed support or backing plate having arranged thereon an anchor 12 and adjustable retractile stops 14 and 16, and associated with the backing plate is a rotatable drum 18. A pair of corresponding interchangeable friction elements or shoes 20 and 22 are supported on the backing plate by steady rests 24 and 26.

Each of the friction elements or shoes includes a web 28 supporting a rim 30 having suitably secured thereto a friction lining 32 for cooperation with the drum 18, and each shoe has mounted thereon an adjuster indicated generally at 34. The adjusters are operative to automatically adjust the shoes proportionately to wear of the linings on the shoes.

As shown, each of the adjusters 34 includes a block 36 frictionally clamped to the web 28 of the shoe and adapted to slide thereon transversely thereof. The block 36 has a coefficient of friction lower than that of the linings 32 on the shoes. One end of the block is curved as at 38 to conform with the braking surface of the drum for efficient cooperation therewith, and the other end is beveled as at 40 for cooperation with the associated adjustable retractile stop.

The articulate ends of the shoes 20 and 22 are connected by a fluid pressure expansible coupling indicated generally at 42 operative to extend the overall length of the shoes, and the separable ends of the shoes normally embrace the anchor 12. A spring 44 connecting the shoes adjacent their articulate ends serves to retain the coupling against displacement and also to resist extension thereof, and springs 46 and 48 connecting the respective shoes to the anchor 12 serve to retract the shoes upon conclusion of a braking operation and to retain the shoes when in retracted position on the stops 14 and 16.

A fluid pressure actuated motor 50 mounted on the backing plate 10 and connected to the shoes as by thrust pins 52 and 54 is operative to actuate the shoes into engagement with the drum 18 against the resistance of the retractile springs 46 and 48 to effectively retard rotation of the drum.

The expansible coupling 42 includes a cylinder 56 open at one of its ends and closed at its other end as by a head 58 provided with a concentric extension 60 bifurcated as at 62 for the reception of the web 28 of one of the shoes. A piston 64 reciprocable in the cylinder 56 includes a cylindrical body section 66 having a head 68 provided with a concentric port 70 controlled as by a valve 72. A sealing cup 74 seated on the head 68 inhibits seepage of fluid from the cylinder past the piston, and a heavy spring 76 interposed between the cup and the head of the cylinder serves to retain the cup against displacement and also to actuate the piston upon release of pressure thereon. The sealing cup 74 also serves as a cushion seat for the valve 72 normally held closed by a light spring 78 seated on the back of the head and suitably connected to the stem of the valve. The outer end of the cylindrical body 66 is closed by a cap 80 having an opening 82 for venting the cylindrical body section to the atmosphere and a concentric extension 84 bifurcated as at 86 for the reception of the web of one of the shoes.

A piston 88 reciprocable in the cylindrical body section divides the body section into a fluid reservoir 90 forward of the piston 88, and an air chamber 92 back of the piston 88. A sealing cup 94 on the head of the piston 88 inhibits seepage of fluid past the piston, and a light spring 96 interposed between the back of the piston 88 and the cap 80 serves to urge the piston so as to maintain pressure on the fluid in the reservoir 90.

In a normal braking operation, upon energization of the motor 56, the shoes 20 and 22 are actuated into engagement with the drum 18 to effectively retard rotation of the drum. During this operation the friction lining on the shoes and blocks 36 of the adjusters 34 engage the drum concomitantly. The linings have a higher coefficient of friction than that of the blocks of the adjusters, and the linings are subjected to the usual wear incident to a braking operation, whereas wear on the blocks is negligible. This differential in coefficient of friction between the linings and the blocks results in relative movement between the blocks and the shoes. Accordingly, upon return of the shoes to retracted position upon conclusion of a braking operation, the blocks engage the stops 14 and 16 and support the shoes in proper spaced relation to the drum.

Due to the adjustment of the shoes as hereinabove described, when the shoes return to retracted position against the stops under the influence of the retractile springs 46 and 48, the shoes pivot on the stops and the articulate ends of the shoes move slightly in opposite directions against the resistance of the spring 44. This results in release of pressure on the piston 64 of the fluid actuated coupling 42 and consequent movement of the piston under the influence of the spring 76 to take up slack. During this movement of the piston, the valve 72 opens and fluid in the reservoir 90 is displaced therefrom past the valve into that portion of the cylinder 56 forward of the piston 64, completely filling the cylinder, whereupon the valve 72 is closed under the influence of the spring 78 to trap fluid between the head of the cylinder 56 and the piston 64 so that upon a subsequent operation of the brake the coupling functions as a rigid thrust member.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a pair of friction elements, means for actuating the elements, and a floating fluid pressure actuated coupling between the elements operative independently of the actuating means to transmit torque from one friction element to the other during a braking operation and at the conclusion thereof to extend its overall length in response to a readjustment of the friction elements to compensate for lining wear.

2. A brake comprising a pair of friction elements, means for actuating the elements, and an integrally operable hydraulic coupling connecting the elements operative independently of the actuating means, said coupling supported by and between the friction elements to float therewith and adapted to transmit torque from one friction element to the other during a braking operation and extend its overall length between the friction elements at the conclusion of the braking operation in response to a readjustment of the friction elements to compensate for wear.

3. A brake comprising a pair of friction elements having linings subject to wear, automatic adjusters therefor, resilient means connecting the elements, means for actuating the elements, a hydraulic coupling connecting the elements operative to expand upon increase of tension on the resilient means due to action of automatic adjusters.

4. A brake comprising a pair of friction elements having linings subject to wear, automatic adjusters therefor, a tension member connecting the elements, and a unitary integrally operable hydraulic coupling connecting the elements operative to inhibit contraction of the tension member and to automatically extend upon increase of tension on the tension member due to readjustment of the elements.

5. A brake comprising a movable member, a pair of friction elements for cooperation therewith, means for actuating the elements, an adjuster for each of the elements, and an independent unitary hydraulic coupling connecting the elements operative to extend its length between the elements pursuant to spreading apart of the elements connected by it upon readjustment of position of the elements by said adjusters.

6. A brake comprising a movable member, a pair of friction elements for cooperation therewith, means for actuating the elements, means cooperating with the movable member for adjusting each of the elements, and an independent hydraulic coupling connecting the elements and automatically responsive to increase its length between the connected elements upon spreading apart of the elements at such connection during readjustment of position of the elements by said adjusting means.

7. A brake comprising a rotatable drum, a pair of friction elements for cooperation with the drum, means for actuating the elements, means for adjusting each of the friction elements proportionately to wear thereof, and an independent unitary hydraulic coupling supported by and between the friction elements operative to extend its overall length between the elements and to inhibit retrograde movement of the elements upon readjustment of position thereof following wear.

8. A brake comprising a rotatable drum, a pair of friction elements having linings for engagement with the drum, means for actuating the elements, means for adjusting each of the elements proportionately to wear of the linings, and an independent unitary hydraulic coupling between the elements operative to extend its overall dimension between the elements pursuant to spreading apart of the elements upon readjustment following wear.

9. A brake comprising a fixed support, a rotatable drum associated therewith, a pair of friction elements on the support having linings for cooperation with the drum, means for actuating the elements, means cooperating with the drum for adjusting the friction elements proportionately to wear of the linings, and a unitary hydraulic coupling between the friction elements independent of the actuating means operative to extend its overall length between the friction elements to compensate for movement of the friction elements upon readjustment thereof due to wear of the linings.

10. Brake mechanism comprising a rotatable member, a pair of friction elements operable to be actuated to retard rotation of said member, an adjustment device positioned between said friction elements and providing seats therefor, said device provided with a pair of fluid containing chambers communicating through a valve controlled passageway, and means responsive to spreading apart of the friction elements adjacent said seats to displace fluid from one chamber into the other thereby increasing the overall length of the device between the friction elements.

11. Brake mechanism comprising a rotatable member, a pair of friction elements operable to be actuated to retard rotation of said member, an adjustment device positioned between said friction elements and providing seats therefor, said device comprising telescoping members each having a fluid containing chamber and means responsive to spreading apart of the friction elements opposite said seats to displace fluid from the chamber of one member into the chamber of the other member thereby increasing the overall length of the device between the friction elements.

12. Brake mechanism comprising a rotatable member, a pair of friction elements operable to be actuated to retard rotation of said member, an adjustment device positioned between said friction elements and providing seats therefor, said device comprising telescoping piston and cylinder members, each member having a fluid containing chamber, one friction element seating against the piston and the other friction element seating against the cylinder, means yieldingly urging said members to increase their telescoped length between the friction elements, means tending to urge displacement of fluid from the chamber within one member to the chamber within the other member, and means controlling the flow of fluid from one chamber into the other operable to permit such flow in the direction of increasing the telescoped length of the piston and cylinder but adapted to restrain the reverse flow of such fluid.

13. Brake mechanism comprising a rotatable member, a pair of friction elements supported to be urged thereagainst to retard its rotation, means for actuating the elements, an adjustment device positioned between the elements and comprising relatively movable members providing seats for the elements, resilient yielding means normally urging said members to increase the overall dimension of the device between the friction elements, said adjustment device provided with communicating fluid chambers, and means operable to displace fluid from one chamber into the other to permanently maintain an increase in overall dimension of the device between the elements.

14. A brake comprising a fixed support, a rotatable drum associated therewith, a pair of friction elements on the support having linings for cooperation with the drum, means for actuating the elements, a fixed anchor on the drum, means for automatically adjusting the friction elements proportionately to wear on the lining, a floating hydraulic coupling between the elements, and resilient means resisting radial movement of the elements, said coupling automatically expanding to compensate for the radial movement of the elements upon their readjustment at the completion of a braking operation and effective to inhibit retrograde movement thereof.

ANDREW O. McCOLLUM.